(12) United States Patent
Brenner et al.

(10) Patent No.: US 9,435,661 B2
(45) Date of Patent: Sep. 6, 2016

(54) SYSTEMS AND METHODS FOR ATTITUDE FAULT DETECTION BASED ON AIR DATA AND AIRCRAFT CONTROL SETTINGS

(71) Applicant: Honeywell International Inc., Morristown, NJ (US)

(72) Inventors: Mats Anders Brenner, Plymouth, MN (US); John R. Morrison, Minneapolis, MN (US); Danny Thomas Kimmel, Phoenix, AZ (US); Jay Joseph Hansen, Isanti, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/564,344

(22) Filed: Dec. 9, 2014

(65) Prior Publication Data

US 2016/0102994 A1 Apr. 14, 2016

Related U.S. Application Data

(60) Provisional application No. 62/061,425, filed on Oct. 8, 2014.

(51) Int. Cl.
*G01C 23/00* (2006.01)
*B64D 45/00* (2006.01)
(Continued)

(52) U.S. Cl.
CPC ............. *G01C 23/005* (2013.01); *B64D 45/00* (2013.01); *G05D 1/0808* (2013.01); *G07C 5/0808* (2013.01)

(58) Field of Classification Search
CPC .. G01C 23/005; G01C 19/32; G07C 5/0808; B64D 45/00; B64D 43/00; G05D 1/00
USPC ............................................................ 701/7
See application file for complete search history.

(56) References Cited

U.S. PATENT DOCUMENTS

| 4,914,598 A | 4/1990 | Krogmann et al. |
|---|---|---|
| 5,841,537 A | 11/1998 | Doty |

(Continued)

FOREIGN PATENT DOCUMENTS

WO 0042482 7/2000

OTHER PUBLICATIONS

Lundberg et al., "Synthetic Attitude and Heading Reference for Saab Gripen", "Proceedings of the 39th IEEE Conference on Decision and Control", Dec. 2000, pp. 2040-2043, Publisher: IEEE, Published in: Sydney, Australia.

(Continued)

*Primary Examiner* — McDieunel Marc
*Assistant Examiner* — James E Stroud
(74) *Attorney, Agent, or Firm* — Fogg & Powers LLC

(57) ABSTRACT

Systems and methods for attitude fault detection based on air data and aircraft control settings are provided. In one embodiment, a sensor monitor for an aircraft attitude measurement system comprises: an aircraft model configured to model a plurality of states, the plurality of states including at least an aircraft attitude state, an aircraft velocity state, a sink rate error state, and a wind velocity state; a propagator-estimator configured to utilize the plurality of states of the aircraft model to process air data measurements and attitude measurements from a first inertial measurement unit of the aircraft attitude measurement system; and a residual evaluator configured to input residual error values generated by the propagator-estimator, wherein the residual evaluator outputs an alert signal when the residual error values exceed a predetermined statistical threshold.

20 Claims, 4 Drawing Sheets

(51) Int. Cl.
*G05D 1/08* (2006.01)
*G07C 5/08* (2006.01)

(56) References Cited

U.S. PATENT DOCUMENTS

| | | | |
|---|---|---|---|
| 6,094,608 A * | 7/2000 | Bomans | B64D 43/00 701/14 |
| 6,782,742 B1 | 8/2004 | Adebjork et al. | |
| 7,587,277 B1 | 9/2009 | Wells | |
| 8,010,308 B1 | 8/2011 | Churchill | |
| 8,275,544 B1 | 9/2012 | Wells et al. | |
| 8,311,739 B2 | 11/2012 | Huddle | |
| 8,682,507 B2 | 3/2014 | Ezerzere et al. | |
| 2003/0016145 A1 | 1/2003 | Bateman | |
| 2004/0027570 A1 * | 2/2004 | Caldwell | B64D 43/00 356/338 |
| 2005/0114023 A1 | 5/2005 | Williamson et al. | |
| 2008/0269963 A1 | 10/2008 | Vos et al. | |
| 2013/0197724 A1 * | 8/2013 | Ellis | B64D 43/00 701/6 |
| 2013/0325245 A1 * | 12/2013 | Kolcarek | G06F 17/00 701/29.1 |
| 2014/0240147 A1 * | 8/2014 | Goda | B64D 1/16 340/945 |
| 2015/0097706 A1 * | 4/2015 | Perger | G01C 23/00 340/977 |
| 2015/0253150 A1 * | 9/2015 | Guillet | G01C 23/005 701/480 |

OTHER PUBLICATIONS

Sabatini, "Quaternion-Based Extended Kalman Filter for Determining Orientation by Inertial and Magnetic Sensing", "IEEE Transactions on Biomedical Engineering", Jun. 19, 2006, pp. 1346-1356, vol. 53, No. 7.

European Patent Office, Extended European Search Report from European patent application No. 15188275.0, from foreign counterpart of U.S. Appl. No. 14/564,359, Mar. 1, 2016, pp. 17, Published in: EP.

European Patent Office, Extended European Search Report from European patent application No. 15188273.5, from foreign counterpart of U.S. Appl. No. 14/564,344, Feb. 25, 2016, pp. 18, Published in: EP.

* cited by examiner

SYSTEMS AND METHODS FOR ATTITUDE FAULT DETECTION BASED ON AIR DATA AND AIRCRAFT CONTROL SETTINGS

CROSS-REFERENCE TO RELATED APPLICATIONS

This application claims priority to, and the benefit of, U.S. Provisional Application No. 62/061,425 entitled "ATTITUDE FAULT DETECTION BASED ON AIR DATA AND AIRCRAFT CONTROL SETTINGS" which was filed on Oct. 8, 2014 and which is herein incorporated by reference in its entirety.

BACKGROUND

Current commercial aircraft designs are drawn to eliminating the need for having three operable high-grade (i.e., navigation grade) air-data inertial reference units for obtaining aircraft attitude measurements. The desire is to have an aircraft that includes only two high-grade inertial reference units, and have a third unit that is a low-grade inertial sensor, such as a micro-electromechanical (MEMS) inertial sensor. At the same time, there is a desire to maintain the capability for the aircraft to take-off, even when one of the two high-grade inertial reference units is out-of-service (for example, due to an inertial sensor fault). Take-off and operation of an aircraft with two reliable sources for attitude measurements is not problematic in itself, but a situation can develop where one of the two remaining in-service inertial sensors degrades during flight and begins to output attitude data that includes some level of bias error. In that case, when the flight crew observes that the two in-service inertial sensors are producing differing roll and/or pitch data, they need to be able to determine which of the sensors is providing accurate attitude measurements and which is not.

For the reasons stated above and for other reasons stated below which will become apparent to those skilled in the art upon reading and understanding the specification, there is a need in the art for alternate systems and methods for attitude fault detection based on air data and aircraft control settings.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

SUMMARY

Figure 1:
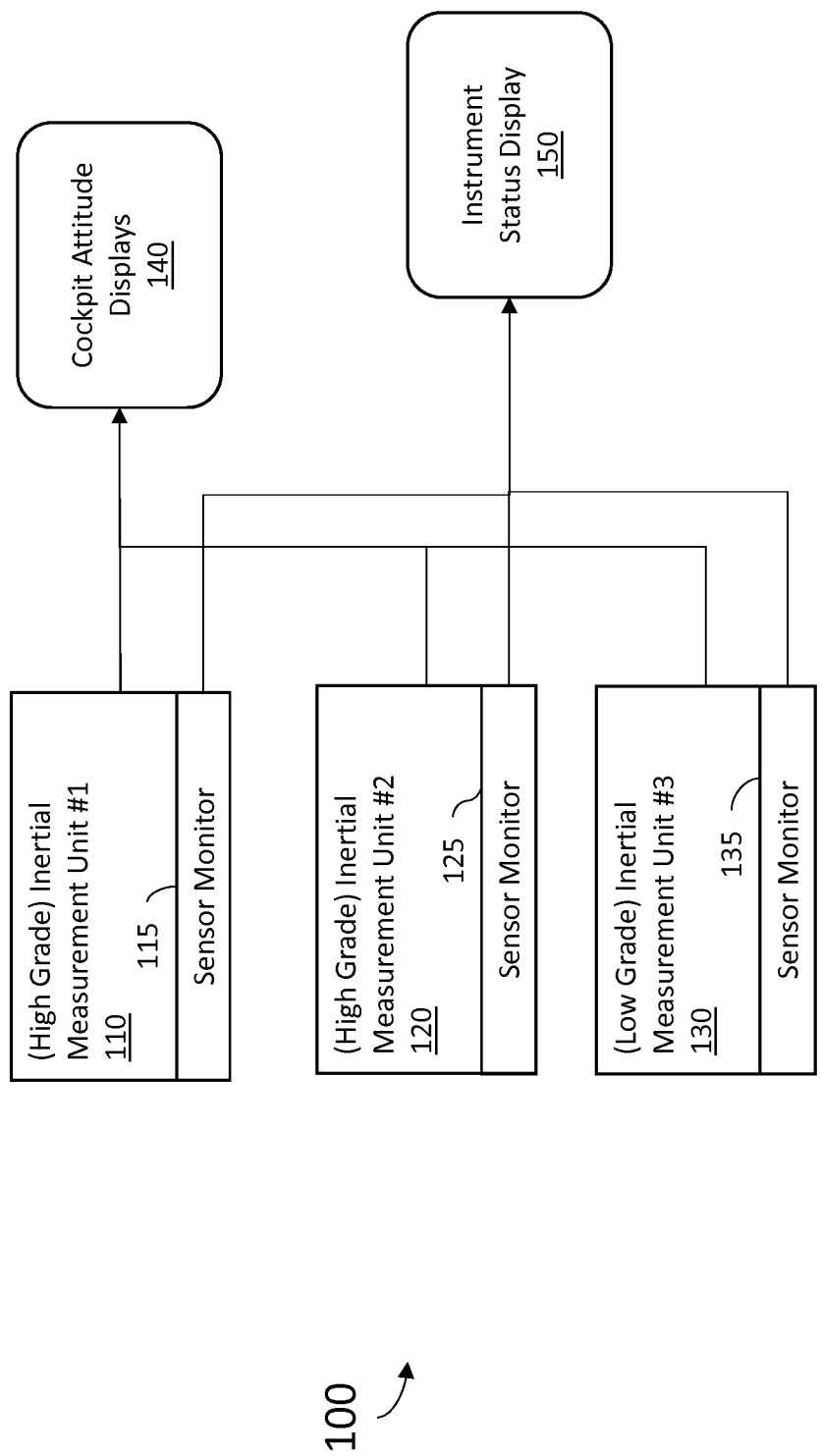
FIG. 1 is a diagram illustrating an avionics system for providing aircraft attitude measurements of one embodiment of the present disclosure.

The Embodiments of the present invention provide methods and systems for providing attitude fault detection and will be understood by reading and studying the following specification.

Systems and methods for attitude fault detection based on air data and aircraft control settings are provided. In one embodiment, a sensor monitor for an aircraft attitude measurement system comprises: an aircraft model configured to model a plurality of states, the plurality of states including at least an aircraft attitude state, an aircraft velocity state, a sink rate error state, and a wind velocity state; a propagator-estimator configured to utilize the plurality of states of the aircraft model to process air data measurements and attitude measurements from a first inertial measurement unit of the aircraft attitude measurement system; and a residual evaluator configured to input residual error values generated by the propagator-estimator, wherein the residual evaluator outputs an alert signal when the residual error values exceed a predetermined statistical threshold.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The proposed embodiments described herein employ a simple model of airplane dynamics to determine if an indicated attitude (roll or pitch) provided by an inertial sensor is commensurate with other measured or quantifiable entities such as true air speed (TAS), barometric altitude rate, angle of attack (AOA), thrust and rudder setting. The mentioned parameters in combination with roll and pitch form a redundant set of dynamic parameters and by attempting to apply them all to the simple model as measurements (or observations) a conflict will be observed if either roll or pitch measurements, or both, are off. This conflict will appear as a systematic offsets in the propagator-estimator algorithm measurement residuals and as these reach a level that is beyond the uncertainty of the measured parameters versus the model the device providing the pitch and roll is invalidated. The propagator-estimator algorithm may be implemented using a Kalman filter or Kalman filter equivalent. Thresholds can be applied to the residuals so that attitude errors greater than predetermined levels trigger an alert. For example, in one embodiment a component evaluating the residuals from an inertial measurement unit can determine if roll is off (e.g., by more than 10 degrees) or pitch is off (e.g., by more than 5 degrees) or if both pitch and roll are off for the navigation device. When two attitude reference systems output different answers, the proposed embodiments can look at all available airplane dynamic input parameters and indicate which of the two attitude reference systems is in error. Embodiments described herein extend dynamic state estimation techniques to not only include navigation specific parameter modeling such as attitude and velocity but also parameters tied to models of the aircraft dynamic state such as angle of attack, rudder settings and/or position and applied trust.

FIG. 1 is a diagram illustrating an avionics system 100 for providing aircraft attitude measurements (i.e., aircraft pitch and roll measurements) to the aircraft's flight crew. The system includes three inertial measurement units 110, 120 and 130. In the particular embodiment shown in FIG. 1, system 100 includes a first high-grade inertial measurement unit (110) and a second high-grade inertial measurement unit (120) and further includes a low-grade inertial measurement unit (130) which may be implemented using an MEMS inertial sensor, for example. However, system 100 need not be limited to this particular configuration. In other embodiments, the inertial measurement units may all be high-grade, all low-grade, all different grades, or any combination thereof. Further, in alternate embodiments, system 100 may comprise more than, or less than, 3 inertial measurement units. The three inertial units 110, 120 and 130 output data to one or more cockpit attitude displays 140 that provide aircraft attitude measurement information to the flight crew.

As illustrated in FIG. 1, with embodiments of the present disclosure, each of the inertial measurement units 110, 120 and 130 has an associated sensor monitor (shown at 115, 125 and 135) that identifies when attitude data from its inertial sensor is suspect or failed and generates an alarm which is displayed on an instrument status display 150. The sensor monitors 115, 125 and 135 may be integral to the inertial measurement units 110, 120 and 130 as shown in FIG. 1. In other embodiments, the sensor monitors 115, 125 and 135 may be implemented externally from the inertial measurement units 110, 120 and 130. For example, in one embodiment, the sensor monitors 115, 125 and 135 may be implemented within the avionics equipment associated with the cockpit attitude displays 140, or the instrument status display 150.

Figure 2:
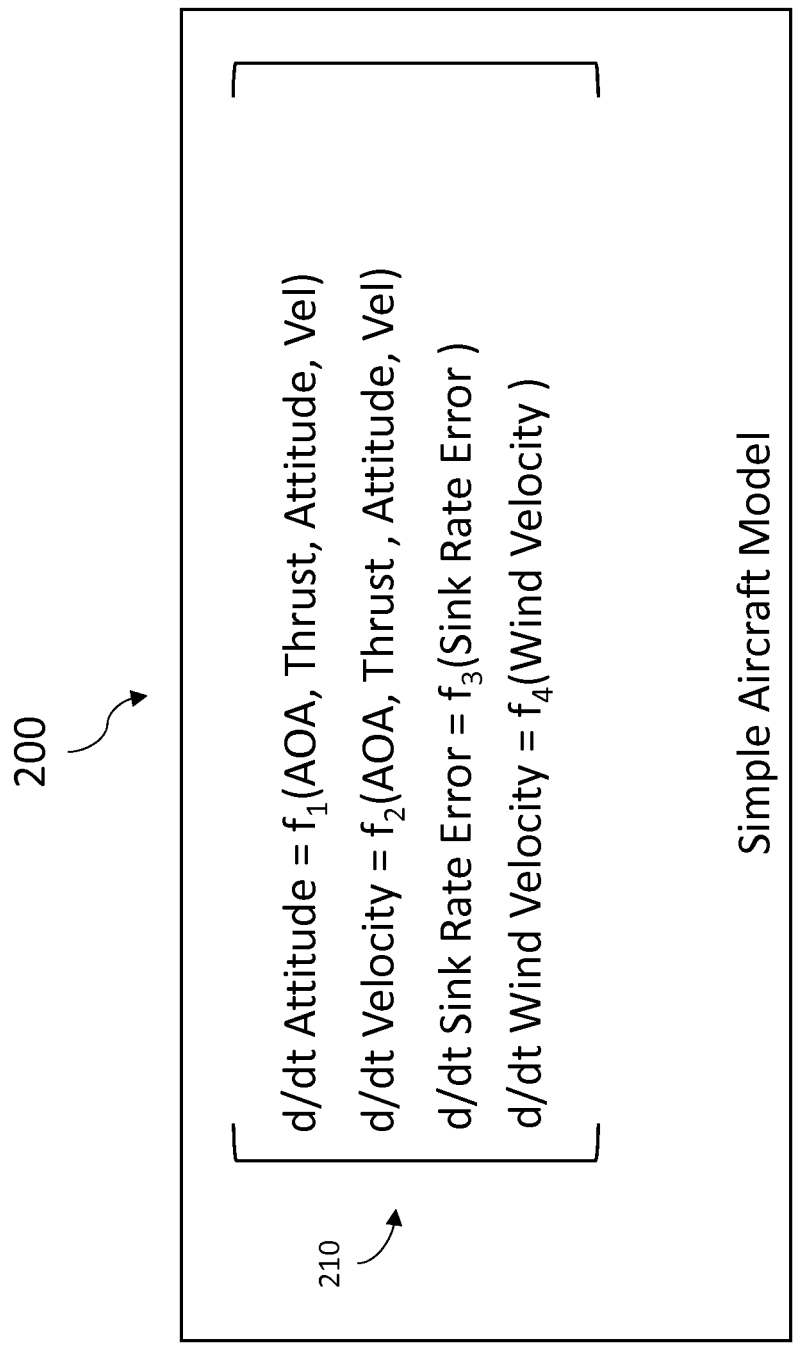
FIG. 2 is a diagram illustrating a simple aircraft model utilized by a sensor monitor of one embodiment of the present disclosure.

FIG. 2 is a diagram illustrating a simple aircraft model 200 utilized by one of the sensor monitors 115, 125 or 135 for mathematically modeling a simplified subset of the aircraft's states (shown at 210) relevant to attitude determination. Here attitude represents any chosen attitude representation such as a 4 component quaternion, a 9 component orthonormal matrix or 3 Euler angles, Vel represents a 3 component velocity vector, d/dt is the time derivative and $f_1$, $f_2$, $f_3$, $f_4$ are (vector) functions. The Sink Rate Error and Wind Velocity represent stochastic processes and as such may have multiple modeling states. Typical processes that may be used for these are first or second order Gauss-Markov processes. These processes are added to represent uncertainty in wind and barometric sink rate. When an inertial sensor unit is accurately producing both pitch and roll measurements, then the pitch and roll data displayed from that inertial sensor unit should be commensurate with the state estimates produced by aircraft model 200. For example, if the aircraft is experiencing a roll of "x" degrees, then the aircraft should be experiencing either a corresponding load factor on the aircraft (observable from angle-of-attack data) or should be falling in altitude (i.e. have a sink rate which is observable from baro altimeter data).

As shown in FIG. 2, changes in aircraft attitude are modeled by the time derivative of a first state vector "d/dt Attitude" which is calculated by model 200 as a function of the aircraft's present thrust, rudder positions and angle-of-attack as well as the velocity states and the attitude states. In some embodiments the rudder setting may not be used. Present thrust, angle-of-attack and rudder setting may be collected from other aircraft systems and sensors. The second state vector time derivative "d/dt Velocity" is also calculated by model 200 as a function of the aircraft's present thrust, rudder positions, angle-of-attack, attitude and velocity. A third state variable, referred to as the "Sink Rate Error" represents the uncertainty in the measured barometric sink rate. It should be appreciated that altimeter measurements produced from the aircraft's barometric altimeter (air data unit) are not perfectly geometric representations of the aircraft's altitude, but will also change depending on environmental conditions such as air temperature and local air pressure variations. As such, the derived barometric Sink Rate comprises a rate measurement that roughly represents true geometric changes in the aircraft's altitude and the error in this measurement is modeled by the state vector Sink Rate Error. The fourth state vector derivative "Wind Velocity" is a wind velocity estimate representing the error in the measured True Air Speed obtained from aircraft sensors (air data unit).

Figure 3:
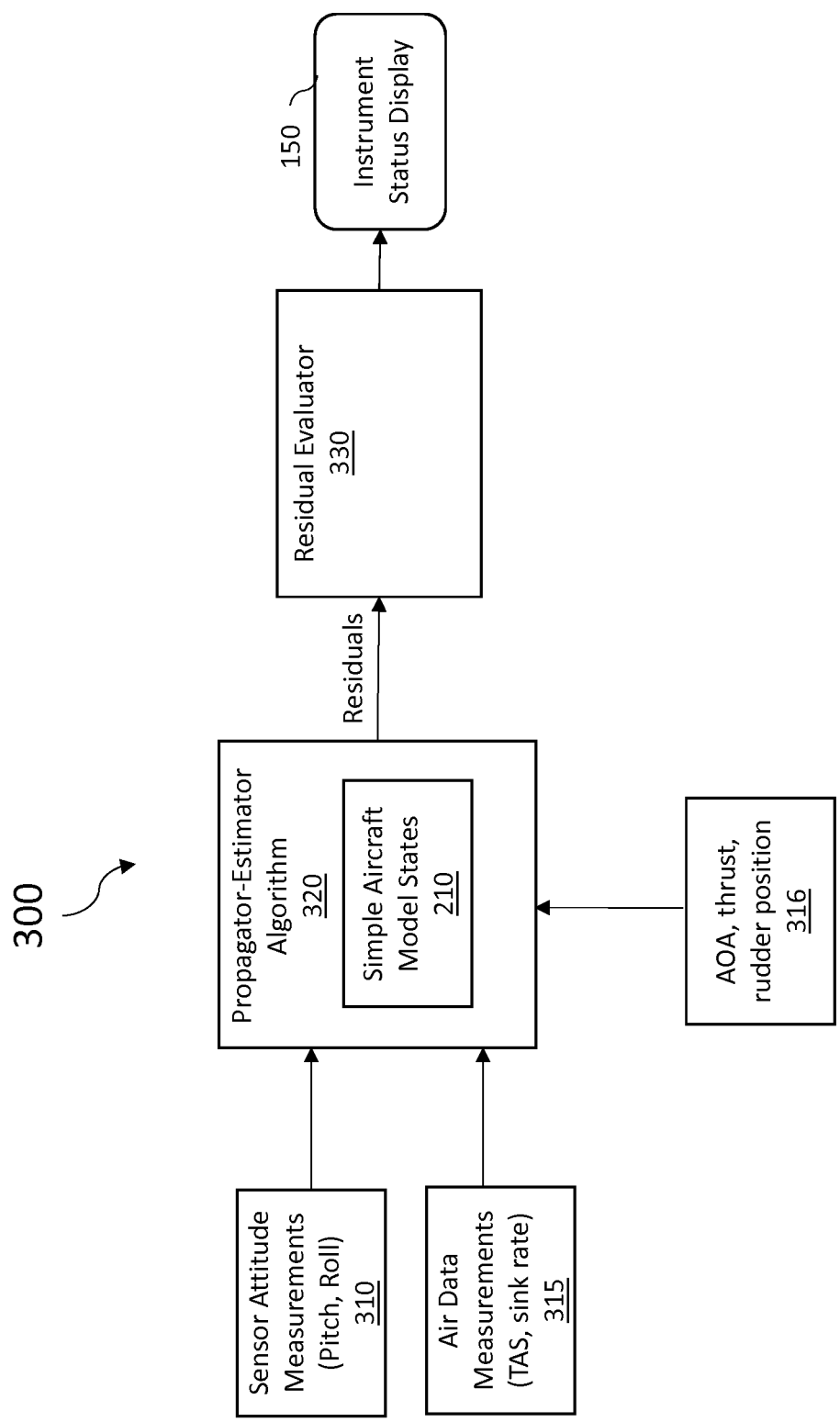
FIG. 3 is a diagram further illustrating a sensor monitor of one embodiment of the present disclosure.

FIG. 3 is a diagram further illustrating a sensor monitor 300, which may implement any one of the sensor monitors 115, 125, 135 illustrated in FIG. 1. Within sensor monitor 300, the simplified aircraft model 200 is used to propagate the states 210 used by a propagator-estimator algorithm 320. For some embodiments, propagator-estimator algorithm 320 may be implemented using a Kalman Filter or equivalent propagator-estimator algorithm. The propagator-estimator algorithm 320 implements state predictor and state update algorithms. That is, the propagator-estimator algorithm 320 predicts what the values of a future set of the states 210 should be based on the present values of the states 210 using the simplified aircraft model 200. Present values may be determined, for example, based on AOA, thrust and rudder position information (shown at 316) as previously discussed. Propagator-estimator algorithm 320 then updates its own filter states by comparing that prediction to the present sensor attitude measurements 310 and Air data measurements 315, while considering any errors that can be normally expected in that data due to noise, equipment tolerances and environmental conditions. Any differences in the measurements and the measurement predictions based on propagator-estimator algorithm 320's updated states represent a deviation referred to as a residual error. If the residual is small, the propagator-estimator algorithm 320 will attempt to correct for the error by applying the residual error (or at least some fraction of it) into its next iteration of predicted values of states 210. If the source of that initial residual error is consistent, then future residual errors calculated from subsequent iterations of predicted values should be smaller than the initial residual error.

However, if there is a systemic problem with the applied measurements, large residuals will continue to occur and exceed any expected deviations that otherwise could be attributed to noise in the data (for example, due to wind variations or local pressure changes) falling within an expected bounds of the error distribution. Accordingly, sensor monitor 300 further includes a residual evaluator 330. If the residual evaluator 330 determines that a residual error output from Kalman Filters 320 is beyond some predetermined statistical threshold (e.g., greater than some $K\sigma$ for a predetermined K and standard deviation $\sigma$), then there is an inconsistency between the model 200 and the inertial sensor attitude measurement 310 which indicates that the inertial measurement unit providing the sensor attitude measurement 310 has degraded or failed. At that point, the sensor monitor 300 output a signal that generates an alert on instrument status display 150. For example, if the sensor monitor 115 for (High Grade) Inertial Measurement Unit #1 110 detects a fault, then it outputs an alert on instrument status display 150 such as "Inertial #1 Attitude Fault". If the sensor monitor 125 for (High Grade) Inertial Measurement Unit #3 120 detects a fault, then it outputs an alert on instrument status display 150 such as "Inertial #2 Attitude Fault". Similarly, if the sensor monitor 135 for (Low Grade) Inertial Measurement Unit #3 130 detects a fault, then it outputs an alert on instrument status display 150 such as "Inertial #3 Attitude Fault". The flight crew thus become informed of the degraded condition of the faulted inertial measurement unit(s) and rely on the attitude measurements from the remaining unit for the balance of the flight. It should be noted that erroneous attitude data from either the roll or pitch component may be used as the basis to disregard all attitude data from the affected inertial measurement unit.

Figure 4:
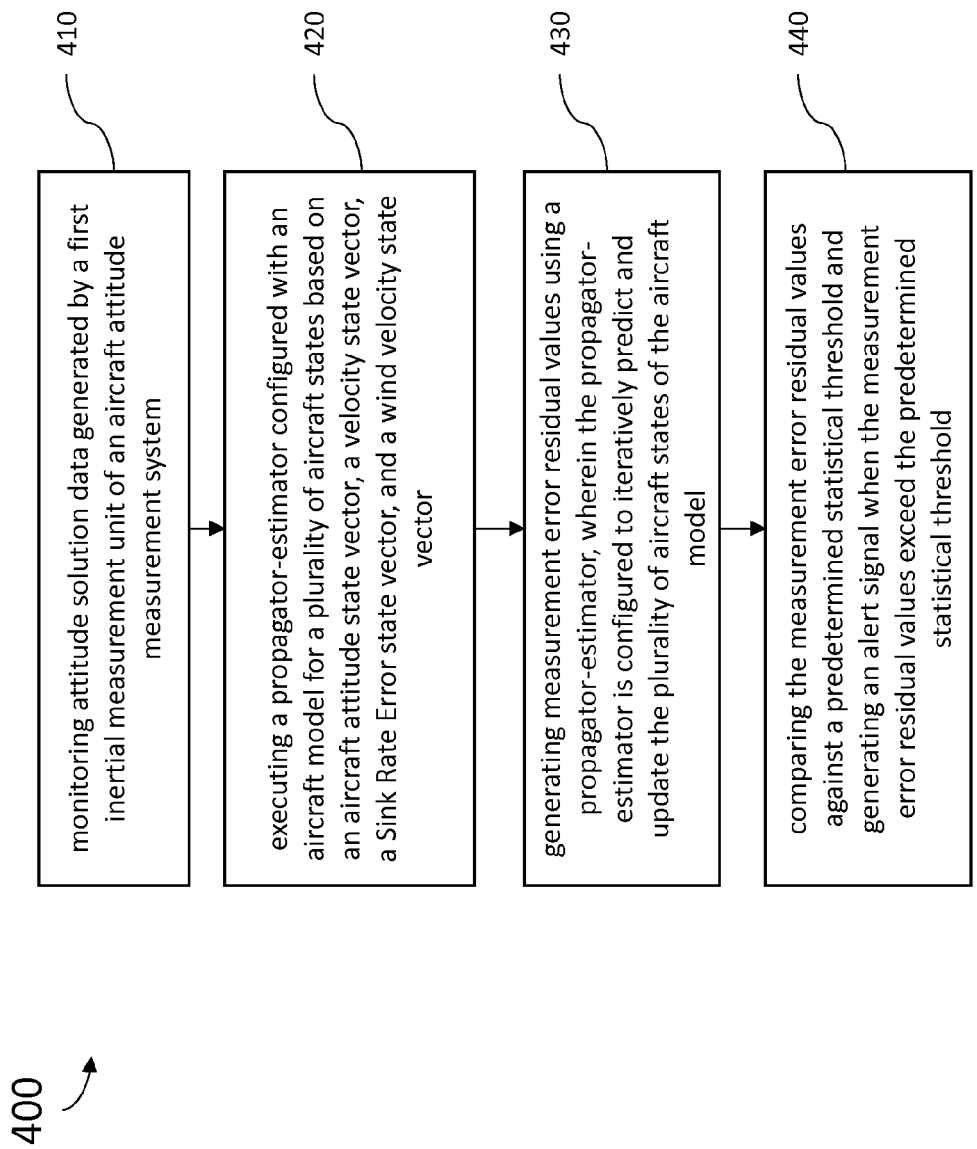
FIG. 4 is a flow chart illustrating a method of one embodiment of the present disclosure.

FIG. 4 is a diagram illustrating a method 400 of one embodiment of the present invention. In some embodiments, method 400 may be used to implement any of the embodiments described with respect to FIGS. 1 to 3. The method begins at 410 with monitoring attitude solution data generated by a first inertial measurement unit of an aircraft attitude measurement system. In one embodiment the aircraft attitude measurement system may include a set of inertial measurement units such as inertial measurement units 110, 120 and 130 shown in FIG. 1. In one embodiment the system includes a first high-grade inertial measurement unit and a second high-grade inertial measurement unit and further includes a low-grade inertial measurement unit which may be implemented using an MEMS inertial sensor, for example. However, the aircraft attitude measurement system need not be limited to this particular configuration. In other embodiments, the inertial measurement units may all be high-grade, all low-grade, all different grades, or any combination thereof. Further, in alternate embodiments, method 400 may be implemented within a system that comprises more than, or less than, 3 inertial measurement units. The inertial measurement units are each configured to output data to one or more cockpit attitude displays that provide aircraft attitude measurement information to the flight crew.

The method proceeds to 420 with executing a propagator-estimator configured with an aircraft model for a plurality of aircraft states based on an aircraft attitude state vector, a velocity state vector, a Sink Rate Error state vector, and a wind velocity state vector. In one embodiment, the aircraft model is implemented using the simple aircraft model 200 described above with respect to FIG. 2. The time derivative of attitude vector "d/dt Attitude" may be calculated from a function of the aircraft present thrust, rudder positions, angle-of-attack, velocity and attitude. Present thrust, angle-of-attack and rudder setting may be collected from other aircraft systems and sensors. The second state vector time derivative "d/dt Velocity" is also calculated by the aircraft model as a function of the aircraft's present thrust, rudder positions, angle-of-attack, attitude and velocity. A third state variable, referred to as the "Sink Rate Error" represents the uncertainty in the measured barometric sink rate. It should be appreciated that altimeter measurements produced from the aircraft's barometric altimeter (air data unit) are not perfectly geometric representations of the aircraft's altitude, but will also change depending on environmental conditions such as air temperature and local air pressure variations. As such, the derived barometric Sink Rate comprises a rate measurement that roughly represents true geometric changes in the aircraft's altitude and the error in this measurement is modeled by the state vector Sink Rate Error. The fourth state vector derivative "Wind Velocity" is a wind velocity estimate representing the error in the measured True Air Speed obtained from aircraft sensors (air data unit). The propagator-estimator may be implemented using a Kalman filter or some variant or equivalent thereof. The method proceeds to 430 with generating measurement error residual values using a propagator-estimator, wherein the propagator-estimator is configured to iteratively predict and update the plurality of aircraft states of the aircraft model.

The method proceeds to 440 with comparing the measurement error residual values against a predetermined statistical threshold and generating an alert signal when the measurement error residual values exceed the predetermined statistical threshold. If there is a systemic problem with the inertial data generated by the first inertial measurement unit being monitored, and in particular the pitch or roll, large residuals will occur and exceed any expected deviations that otherwise could be attributed to noise in the data. The measurement error residual values will consequently fall outside the expected bounds of the error distribution indicating that there is an inconsistency between the aircraft model and the inertial sensor attitude measurement. The inconsistency between the aircraft model and the inertial sensor attitude measurement indicates that the inertial measurement unit providing the sensor attitude measurement has degraded or failed. In one embodiment, generating the alert signal is implemented by sensor monitor 300 outputting a signal that generates an alert on instrument status display 150.

Example Embodiments

Example 1 includes a sensor monitor for an aircraft attitude measurement system, the sensor monitor comprising: an aircraft model configured to model a plurality of states, the plurality of states including at least an aircraft attitude state, an aircraft velocity state, a sink rate error state, and a wind velocity state; a propagator-estimator configured to utilize the plurality of states of the aircraft model to process air data measurements and attitude measurements from a first inertial measurement unit of the aircraft attitude measurement system; and a residual evaluator configured to input residual error values generated by the propagator-estimator, wherein the residual evaluator outputs an alert signal when the residual error values exceed a predetermined statistical threshold.

Example 2 includes the sensor monitor of example 1, wherein the aircraft velocity state time derivative is calculated as a function of one or more of the aircraft's angle-of-attack, rudder settings, thrust setting, attitude and velocity.

Example 3 includes the sensor monitor of any of examples 1-2, wherein the sink rate error state time derivative is calculated as a function of barometric altimeter measurements.

Example 4 includes the sensor monitor of examples 3, wherein the sink rate error state (or states) defines a stochastic process representing an error in the sink rate measurement.

Example 5 includes the sensor monitor of any of examples 1-4, wherein the wind velocity state time derivative is calculated as a function of True Air Speed as obtained from aircraft sensor data.

Example 6 includes the sensor monitor of example 5, wherein the wind velocity state (or states) defines a stochastic process representing error in the true air speed measurement.

Example 7 includes the sensor monitor of any of examples 1-6, wherein the alert signal produces an alert on a display that indicates that the first inertial measurement unit is faulted.

Example 8 includes the sensor monitor of any of examples 1-7, wherein the sensor monitor is internal to the first inertial measurement unit.

Example 9 includes a fault detection system for aircraft attitude measurement system, the fault detection system comprising: a sensor monitor coupled to a first inertial measurement unit of the aircraft attitude measurement system, the sensor monitor comprising: an aircraft model of an aircraft, the aircraft model configured to model a plurality of aircraft states, the plurality of aircraft states including at least an aircraft attitude state, an aircraft velocity state, a sink rate error state, and a wind velocity state; a propagator-estimator configured to propagate and update the plurality of aircraft states of the aircraft model based on air data measurements and attitude measurements from the first inertial measurement unit; and a residual evaluator coupled to the propagator-estimator and configured to input measurement error residual values generated by the propagator-estimator, wherein the residual evaluator outputs an alert signal when the measurement error residual values exceed a predetermined statistical threshold.

Example 10 includes the fault detection system of example 9, wherein the sensor monitor is internal to the first inertial measurement unit.

Example 11 includes the fault detection system of any of examples 9-10, wherein the propagator-estimator is a Kalman filter.

Example 12 includes the fault detection system of any of examples 9-11, further comprising a display; wherein the alert signal produces an alert on the display that indicates that the first inertial measurement unit is faulted.

Example 13 includes the fault detection system of any of examples 9-12, wherein aircraft attitude state includes one or both of an aircraft pitch position and an aircraft roll position.

Example 14 includes the fault detection system of any of examples 9-13, wherein the aircraft attitude state time derivative is calculated as a function of one or more of the aircraft's angle-of-attack, rudder settings, thrust setting, attitude and velocity; wherein the aircraft velocity state time derivative is calculated as a function of one or more of the aircraft's angle-of-attack, rudder settings, thrust setting, attitude and velocity; wherein the sink rate error state time derivative is calculated as a function of barometric altimeter measurements; and wherein the wind velocity state time derivative is calculated as a function of True Air Speed as obtained from aircraft sensor data Example 15 includes a fault detection method for an aircraft attitude measurement system, method comprising: monitoring attitude solution data generated by a first inertial measurement unit of an aircraft attitude measurement system; executing a propagator-estimator configured with an aircraft model for a plurality of aircraft states based on an aircraft attitude state vector, a velocity state vector, a Sink Rate Error state vector, and a wind velocity state vector; generating measurement error residual values using the propagator-estimator, wherein the propagator-estimator is configured to iteratively predict and update the plurality of aircraft states of the aircraft model; and comparing the measurement error residual values against a predetermined statistical threshold and generating an alert signal when the measurement error residual values exceed the predetermined statistical threshold.

Example 16 includes the method of example 15, wherein the propagator-estimator is a Kalman filter.

Example 17 includes the method of any of examples 15-16, wherein the alert signal produces an alert on a display that indicates that the first inertial measurement unit is faulted.

Example 18 includes the method of any of examples 15-17, wherein the aircraft attitude state vector time derivative is calculated as a function of one or more of the aircraft's angle-of-attack, rudder settings, thrust setting, attitude and velocity; wherein the aircraft velocity state vector time derivative is calculated as a function of one or more of the aircraft's angle-of-attack, rudder settings, thrust setting, attitude and velocity; wherein the sink rate error state vector time derivative is calculated as a function of barometric altimeter measurements; and wherein the wind velocity state vector time derivative is calculated as a function of True Air Speed as obtained from aircraft sensor data.

Example 19 includes the method of example 18, wherein the wind velocity state vector defines a stochastic process representing error in the true air speed measurement; and wherein the sink rate error state vector defines a stochastic process representing error in the sink rate measurement.

Example 20 includes the method of any of examples 15-19, wherein aircraft attitude state vector includes one or both of an aircraft pitch position and an aircraft roll position.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A sensor monitor for an aircraft attitude measurement system, the sensor monitor comprising: an aircraft model configured to model a plurality of states, the plurality of states including at least an aircraft attitude state, an aircraft velocity state, a sink rate error state, and a wind velocity state; a propagator-estimator configured to utilize the plurality of states of the aircraft model to process air data measurements and attitude measurements from a first inertial measurement unit of the aircraft attitude measurement system; and a residual evaluator configured to input residual error values generated by the propagator-estimator, wherein the residual evaluator outputs an alert signal when the residual error values exceed a predetermined statistical threshold; and wherein the alert signal initiates an alert on a device that indicates that the first inertial measurement unit is faulted.

2. The sensor monitor of claim 1, wherein the aircraft velocity state time derivative is calculated as a function of one or more of the aircraft's angle-of-attack, rudder settings, thrust setting, attitude and velocity.

3. The sensor monitor of claim 1, wherein the sink rate error state time derivative is calculated as a function of barometric altimeter measurements.

4. The sensor monitor of claim 3, wherein the sink rate error state defines a stochastic process representing an error in the sink rate measurement.

5. The sensor monitor of claim 1, wherein the wind velocity state time derivative is calculated as a function of True Air Speed as obtained from aircraft sensor data.

6. The sensor monitor of claim 5, wherein the wind velocity state defines a stochastic process representing an error in the true air speed measurement.

7. The sensor monitor of claim 1, wherein the alert signal produces an alert on a display that indicates that the first inertial measurement unit is faulted.

8. The sensor monitor of claim 1, wherein the sensor monitor is internal to the first inertial measurement unit.

9. A fault detection system for aircraft attitude measurement system, the fault detection system comprising: a sensor monitor coupled to a first inertial measurement unit of the aircraft attitude measurement system, the sensor monitor comprising: an aircraft model of an aircraft, the aircraft model configured to model a plurality of aircraft states, the plurality of aircraft states including at least an aircraft attitude state, an aircraft velocity state, a sink rate error state, and a wind velocity state; a propagator-estimator configured to propagate and update the plurality of aircraft states of the aircraft model based on air data measurements and attitude measurements from the first inertial measurement unit; and a residual evaluator coupled to the propagator-estimator and configured to input measurement error residual values generated by the propagator-estimator, wherein the residual evaluator outputs an alert signal when the measurement error residual values exceed a predetermined statistical threshold; and a status device, wherein the alert signal produces an alert on the status device that indicates that the first inertial measurement unit is faulted.

10. The fault detection system of claim 9, wherein the sensor monitor is internal to the first inertial measurement unit.

11. The fault detection system of claim 9, wherein the propagator-estimator is a Kalman filter.

12. The fault detection system of claim 9, the status device comprising a display; wherein the alert signal produces an alert on the display that indicates that the first inertial measurement unit is faulted.

13. The fault detection system of claim 9, wherein aircraft attitude state includes one or both of an aircraft pitch position and an aircraft roll position.

14. The fault detection system of claim 9, wherein the aircraft attitude state time derivative is calculated as a function of one or more of the aircraft's angle-of-attack, rudder settings, thrust setting, attitude and velocity;
   wherein the aircraft velocity state time derivative is calculated as a function of one or more of the aircraft's angle-of-attack, rudder settings, thrust setting, attitude and velocity;
   wherein the sink rate error state time derivative is calculated as a function of barometric altimeter measurements; and
   wherein the wind velocity state time derivative is calculated as a function of True Air Speed as obtained from aircraft sensor data.

15. A fault detection method for an aircraft attitude measurement system, method comprising: monitoring attitude solution data generated by a first inertial measurement unit of an aircraft attitude measurement system; executing a propagator-estimator configured with an aircraft model for a plurality of aircraft states based on an aircraft attitude state vector, a velocity state vector, a Sink Rate Error state vector, and a wind velocity state vector; generating measurement error residual values using the propagator-estimator, wherein the propagator-estimator is configured to iteratively predict and update the plurality of aircraft states of the aircraft model; and comparing the measurement error residual values against a predetermined statistical threshold and generating an alert signal on a device that indicates that the first inertial measurement unit is faulted when the measurement error residual values exceed the predetermined statistical threshold.

16. The method of claim 15, wherein the propagator-estimator is a Kalman filter.

17. The method of claim 15, wherein the alert signal produces an alert on a display that indicates that the first inertial measurement unit is faulted.

18. The method of claim 15, wherein the aircraft attitude state vector time derivative is calculated as a function of one or more of the aircraft's angle-of-attack, rudder settings, thrust setting, attitude and velocity;
   wherein the aircraft velocity state vector time derivative is calculated as a function of one or more of the aircraft's angle-of-attack, rudder settings, thrust setting, attitude and velocity;
   wherein the sink rate error state vector time derivative is calculated as a function of barometric altimeter measurements; and
   wherein the wind velocity state vector time derivative is calculated as a function of True Air Speed as obtained from aircraft sensor data.

19. The method of claim 18, wherein the wind velocity state vector defines a stochastic process representing error in the true air speed measurement; and
   wherein the sink rate error state vector defines a stochastic process representing error in the sink rate measurement.

20. The method of claim 15, wherein aircraft attitude state includes one or both of an aircraft pitch position and an aircraft roll position.

* * * * *